324-77
12-2-75 XR 3,924,188
SR

United States Patent [19]
Hofbauer

[11] 3,924,188
[45] Dec. 2, 1975

[54] MEASURING THE TRANSMISSION QUALITY OF A PHASE DIFFERENCE MODULATED CARRIER

[75] Inventor: Rudolf Hofbauer, Munich, Germany

[73] Assignee: Siemens Aktiengesellschaft, Berlin & Munich, Germany

[22] Filed: May 6, 1974

[21] Appl. No.: 467,122

[30] Foreign Application Priority Data
May 4, 1973 Germany ............................ 2322548

[52] U.S. Cl. .................................. 325/67; 324/77 R
[51] Int. Cl.$^2$ .................... H04B 17/00; H04L 27/18
[58] Field of Search ........ 178/67, 69 A; 325/67, 65, 325/363; 179/175.3; 324/77 R, 103

[56] References Cited
UNITED STATES PATENTS

| | | | |
|---|---|---|---|
| 3,041,540 | 6/1962 | Favin | 178/69 A |
| 3,213,196 | 10/1965 | Tuck et al. | 179/175.3 |
| 3,506,918 | 4/1970 | Perreault | 325/363 |
| 3,525,040 | 8/1970 | Rolfe | 324/103 R |

*Primary Examiner*—George H. Libman

[57] ABSTRACT

A method for measuring the transmission quality of pulse controlled, phase difference modulated data signals is described. Phase scanning pulses are produced which occur in the centers of the consecutive modulation sections. The phase difference modulated carrier is subject to amplitude modulation by band limitation, and modulation sections of the phase difference modulated carrier are assigned to modulation sections of the amplitude signal. Scanning pulses occurring in the centers of the modulation sections of the amplitude signal are derived from the phase scanning pulses. By means of the aforementioned scanning pulses, instantaneous values of the amplitude signal are sampled and measured. The maximum and minimum instantaneous values which occur during an observation period are stored by corresponding measured values, and the difference between the two measured values is formed and serves as a measure for transmission quality.

6 Claims, 5 Drawing Figures

MEASURING THE TRANSMISSION QUALITY OF A PHASE DIFFERENCE MODULATED CARRIER

BACKGROUND OF THE INVENTION

The invention relates to a process for measuring the transmission quality of signals which are transmitted under the control of pulses in consecutive modulation sections using a phase-difference-modulated carrier. Phase scanning pulses are produced which occur in the centers of the modulation sections of the phase-difference-modulated carrier. The phase-difference-modulated carrier is subject to an amplitude modulation due to a band limitation. An amplitude signal is produced with the aid of an amplitude demodulator, and modulation sections of the phase-difference-modulated carrier are assigned to modulation sections of the amplitude signal.

When data are transmitted from a data transmitter over a transmission path to a data receiver the transmitted signals are subject to attenuation and transit time distortions. To compensate these distortions the data receiver is usually provided with attenuation and transit time distortion correcting devices. Since the transmission properties of different transmission paths can differ to a very considerable extent, to find a suitable distortion correcting device it is advantageous to provide a measure of the quality of the signals transmitted over the transmission path employed. This measure will be referred to as transmission quality in the following.

In a known arrangement for correcting distortion in signals (see commonly assigned U.S. Pat. No. 3,649,916) in phase modulated data transmission, the envelope curve of the modulated carrier is used to analyze transit time distortions in the transmitted signals. The signal whose envelope curve possesses the least undulation is considered as the signal having the least transit time distortion. When applied to a conventionally band limited transmission, this known arrangement possesses the disadvantage that the amplitude breaks which occur in the event of band limitation, when the phase suddenly changes at the boundaries of the modulation sections, are also taken into consideration. The breaks in amplitude caused by a sudden change in phase result in a considerable undulation in the envelope curve, although the transmission quality is not impaired. In this case the undulation of the envelope curve can be considered as being due to a transit time distortion, and can lead to errors in the evaluation of the transit time distortion of the transmitted signals. Also attenuation distortions in the transmitted signals can adulterate the result of the evaluation.

An object of the invention is, in pulse-governed data transmission using a phase difference-modulated carrier, to provide a process which enables the transmission quality to be measured and which can also be applied even in the case of the band-limited transmission of data by means of phase-difference-modulation with sudden changes in phase.

SUMMARY OF THE INVENTION

In accordance with the invention, in the process of the type mentioned hereinabove, the foregoing and other objects are realized in that from the phase scanning pulses there are derived further scanning pulses which occur in the centre of the modulation sections of the amplitude signal. By means of the scanning pulses, instantaneous values of the amplitude signal are scanned and measured. The maximum and minimum instantaneous values which have occurred during an observation period are stored by appropriate measured values, and the difference between the two measured values is formed and serves as a measure for the transmission quality.

The process in accordance with the invention possesses the advantage that the distortion correction of the transmitted signals need only be carried out to the extent that at the times at which the transmitted signals are scanned with the phase scanning pulses, the transmitted signals are corrected in the best fashion possible. Also, the process possesses the advantage that it is possible to recognize various defects in the data transmitter or data receiver. Further, the arrangement for the execution of the process requires only a very low expense for circuitry.

If the process is to be used for manual adjustment of a distortion correcting device suitable for the relevant transmission path, it is favorable to indicate the difference in the measured values in a display device.

If not only the measure for the existing transmission quality is to be indicated, but it is to also be indicated in which direction the transmission quality is changing, when the amplitude and phase frequency responses of the correction device are changed, it is advantageous to show the difference in the measured values on a pointer type of indicating instrument. If the display device is to be particularly sensitive in the lower measuring range it is advantageous for the pointer instrument to posses a non-linear measuring range.

If the data receiver contains an arrangement for the automatic distortion correction of the transmitted signals it is advantageous that the transmitted signals are automatically corrected in known manner with the aid of the difference between the measured values.

BRIEF DESCRIPTION OF THE DRAWINGS

As exemplary and preferred embodiment of an arrangement for the execution of the process in accordance with the invention will be described in the following making reference to FIGS. 1 to 5. Identical parts of the arrangement and identical signals are provided with identical references.

DETAILED DESCRIPTION OF THE DRAWINGS

Figures 1, 2, 3:
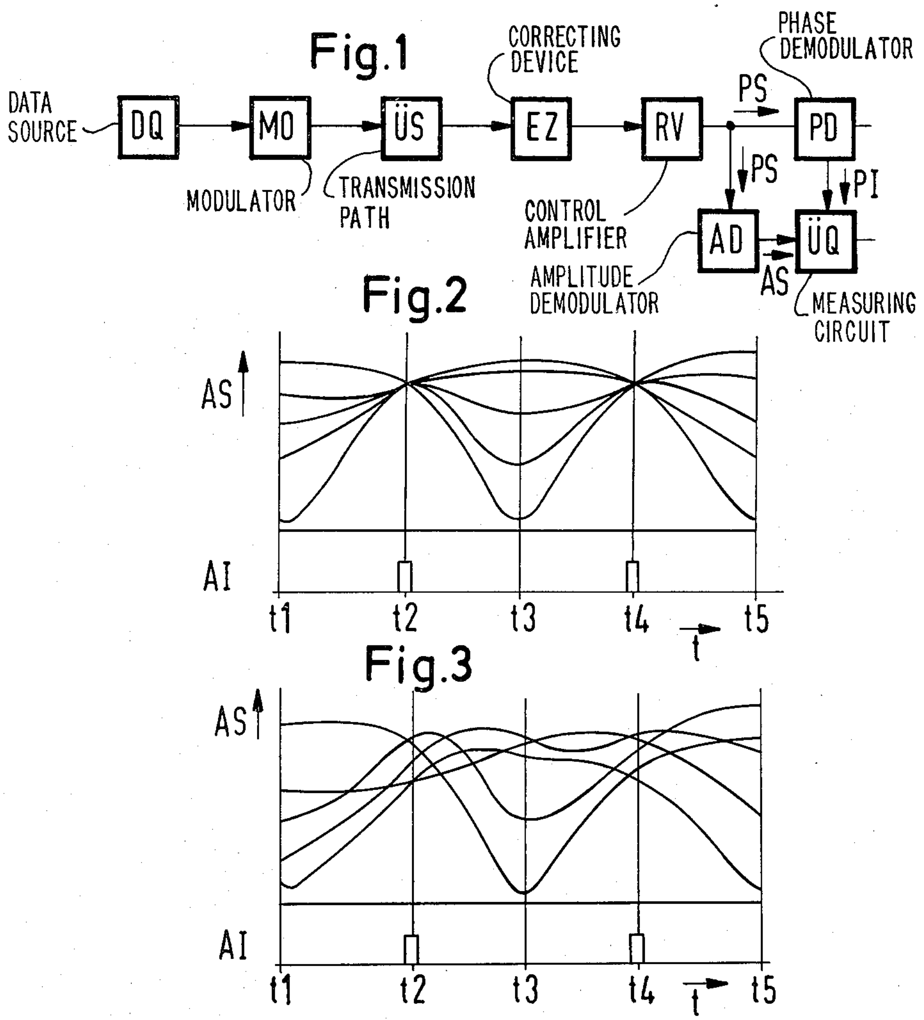
FIG. 1 is a block diagram circuit diagram of a data transmission device for the transmission of data by means of phase difference modulation.
FIG. 2 shows a time-waveform diagram of the scanning pulses and the amplitude signals with best possible correction.
FIG. 3 is a time-waveform diagram of the scanning pulses and the amplitude signals in the event of incomplete correction.

In the data transmission device illustrated in FIG. 1, a data source DQ supplies binary signals to a modulator MO which transmits a phase-difference-modulated carrier in the known manner, after a band limitation through a transmitting filter, across a transmission path US to a data receiver. A data receiver contains a receiving filter and a distortion correcting device EZ for correcting transit time and attenuation distortions. In the transmission of data with an average transmission speed (e.g. 600 to 1800 Bd) over a selectable telephone path as transmission path, to compensate the transit time and attenuation distortions, frequently one employs distortion correcting devices EZ whose setting represents a compromise between settings for a plurality of different telephone paths. At average and high transmission speeds (e.g. 2400 Bd and higher) across a selectable telephone path, frequently automatic distortion correcting devices are used which automatically compensate the distortions occurring on different telephone paths. In transmission at an average transmission speed over a permanently connected telephone path it is possible to replace the automatic correcting devices with considerably cheaper manually adjustable correctors. In order to determine a suitable setting of the correcting device, however, it is necessary to measure and to display the transmission quality of the signals transmitted over the relevant telephone path. The data receiver additionally contains a control amplifier RV which amplifies the phase-difference-modulated carrier and emits it as phase signal PS. The receiver also contains a phase demodulator PD which is supplied with the phase signal PS. The phase detector PD produces phase scanning pulses PI and a receiving pulse train and regains the binary signals from the transmitted signals. Phase demodulators which produce scanning pulses such as the scanning pulses PI are well known as indicated by U.S. Pat. Nos. 3,643,023, 3,564,412, and 3,803,492. These patents describe phase detector devices which would operate in conjunction with the apparatus disclosed herein in order to produce the scanning pulses PI. The data receiver also contains an amplitude demodulator AD which emits an amplitude signal AS corresponding to the amplitude modulation of the phase-difference-modulated carrier. A detailed description of a device which will perform the functions of amplitude demodulator AD and which can be used in conjunction with the apparatus described herein will be found in U.S. Pat. No. 3,564,412. Further, in the receiver is a circuit UQ for measuring the transmission quality which produces further scanning pulses AI from the phase scanning pulses PI and contains two scanning circuits and one difference circuit.

The scanning pulses AI represented in FIG. 2 are produced from the phase scanning pulses PI in such manner that they occur precisely in the centers *t2*, *t4* of the modulation sections *t1* to *t3* and *t3* to *t5* of the amplitude signal AS. In the event of the best possible correction of the transmitted signals, the represented amplitude signals intersect one another at one point in the center of the modulation sections. The instantaneous values of the amplitude signal AS are scanned by the scanning pulses AI and are measured. In the case of a best possible correction of the transmitted signals, the maximum and minimum scanned instantaneous values of the amplitude signal are equal, i.e. the difference between the two is 0.

From the amplitude signals represented in FIG. 3, in the case of an incomplete correction of the transmitted signals it will be seen that the represented amplitude signals do not intersect at one point in the centers *t2*, *t4* of the modulation sections *t1* to *t3* and *t3* to *t5*. The maximum and minimum instantaneous values of the amplitude signal which are scanned and measured by the scanning pulses, are different, and the difference between the two represents a measure for the transmission quality. The smaller the difference, is, the better the transmission quality.

Figure 4:
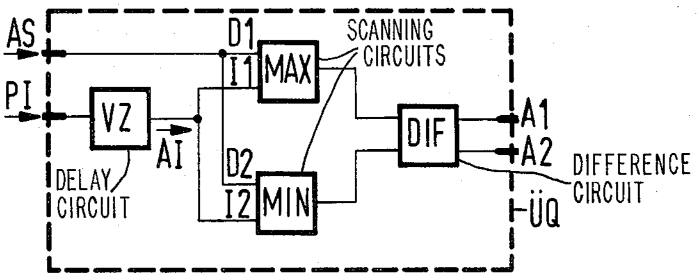
FIG. 4 is a block circuit diagram of a preferred exemplary embodiment of an arrangement for the execution of the process and FIG. 5 is a detailed schematic diagram of a preferred exemplary embodiment of an arrangment for the execution of the process.

The block circuit diagram represented in FIG. 4 of an arrangement UQ for executing the process shows, a delay circuit VZ, two scanning circuits MAX and MIN and a difference former DIF. Since the centers of the modulation sections of the amplitude signal AS are delayed, as a result of transit times in the amplitude demodulator AD, in relation to the centers of the modulation sections of the phase signal PS, the scanning pulses AI are also delayed, by a delay circuit VZ, in relation to the phase scanning pulses PI in such manner that they arrive in the center of the modulation sections of the amplitude signal AS. Each of the two scanning circuits MAX and MIN are supplied, in each case at a first input D1 and D2, respectively, with the amplitude signal AS. The scanning pulses AI are conducted to in each case one second input I1 and I2 of the two scanning circuits MAX and MIN, respectively. With each scanning pulse AI, in the two scanning circuits MAX and MIN, the instantaneous value, applied to the first inputs D1 and D2, of the amplitude signal AS are scanned and measured. The first of the two scanning circuits MAX will now store the instantaneous value under the condition that it is greater than a value stored therein, e.g. in the form of a voltage across a capacitor, instead of this value, as measured value. Similarly, the instantaneous value is stored in the second scanning circuit MIN under the condition that it is smaller than a value stored therein, in place of this value, as measured value. The outputs of the two scanning circuits MAX and MIN to which the stored measured values are applied, are conducted to the difference forming circuit DIF which forms the difference between the measured values. This difference can be conducted to a display device which displays the difference as a measure for the transmission quality, for example on a pointer-type of indicating instrument. The difference between the measured values can also be employed for a known automatic distortion correction of the transmitted signals. The latter mode of automatic distortion correction is described in commonly assigned U.S. Pat. application Ser. No. 90,590.

Figure 5:
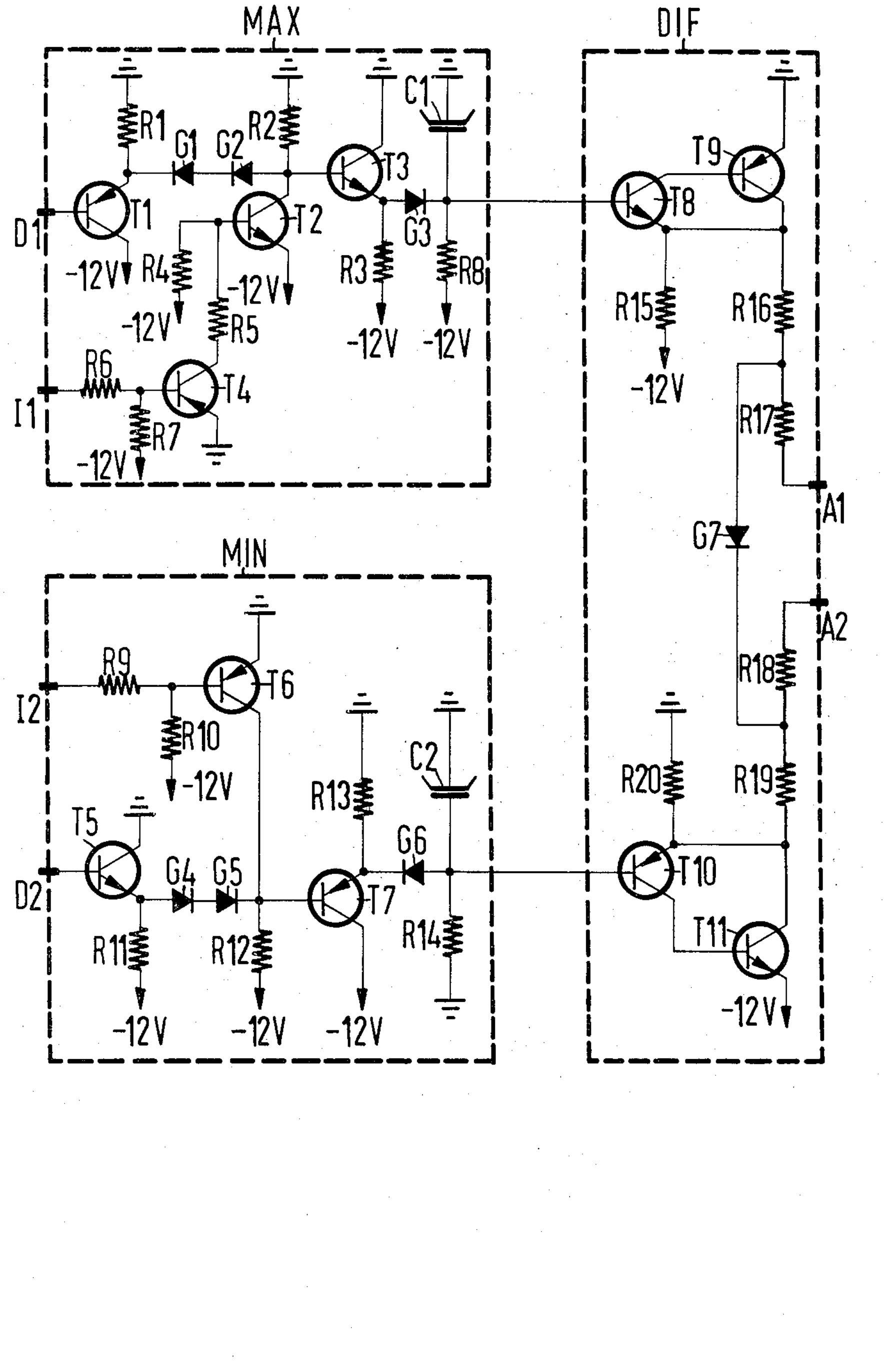

FIG. 5 represents the circuit diagram of a preferred exemplary embodiment, with the scanning circuits MAX and MIN and the difference forming circuit DIF. The delay circuit VZ has not been shown in detail in FIG. 5 since such delay circuits are generally known. The amplitude signal AS is conducted to the inputs D1 and D2, and the scanning pulses AI are conducted to the inputs I1 and I2. The first scanning circuit MAX comprises transistors T1 to T4, diodes G1 to G3, resistors R1 to R8 and the capacitor C1. The second scanning circuit MIN comprises transistors T5 to T7, diodes G4 to G6, resistors R9 to R14 and the capacitor C2.

The difference former DIF is designed to enable a pointer instrument to be connected to its outputs A1 and A2. The latter comprises transistors T8 to T11, diode G7 and resistors R15 to R20. Resistors R17 and R18 are connected by their first terminals to the outputs A1 and A2 of the difference circuit DIF. The second terminals of the resistors R17 and R18 are connected to one another via a diode G7 in such manner that the plus pole of the diode G7 is connected to the second terminal of the resistor R17. The diode G7 causes a shunt which leads to a non-linear measuring range of the pointer instrument. If the difference to be displayed of the measured values present at the outputs A1 and A2 of the difference circuit DIF is large, the diode G7 is in the pass band and a value which is dependent upon the pass voltage of the diode G7 and the values of the resistors R17 and R18 is displayed on the pointer instrument. If the difference to be displayed between the measured values is small the diode G7 blocks and the pointer instrument shows a value which is proportional to the difference to be displayed. The introduction of the diode G7 means that the pointer instrument is protected from overload since the difference which is to be displayed is limited by the diode G7. Also using the diode G7, the measuring range of the pointer instrument is varied in such manner that the pointer instrument is particularly sensitive in the case of small differences.

The embodiments described hereinabove are intended only to be exemplary of the principles of the invention. It is contemplated that the described embodiments can be modified or changed while remaining with the scope of the invention as defined by the appended claims.

I claim:

1. In a data transmission system wherein message signals are transmitted using phase difference modulation in a pulse-controlled manner and in consecutive modulation sections, said phase difference modulated carrier being subject to amplitude modulation by band limitation, wherein phase scanning pulses, occurring in the centers of consecutive modulation sections, are produced and wherein an amplitude demodulator produces an amplitude signal, modulation sections of said phase difference modulated carrier being assigned to modulation section of said amplitude signal, a method for measuring the quality of the transmitted signals, comprising:

- deriving scanning pulses from said phase scanning pulses, occurring in the centers of the modulation sections of the amplitude signal,
- sampling and measuring instantaneous values of said amplitude signal using said scanning pulses,
- storing measured values corresponding to maximum and minimum instantaneous values of said amplitude signal occurring during an observation period and
- forming the difference between said maximum and minimum values, which difference serves as a measure of the transmission quality.

2. The method defined in claim 1 comprising the additional step of:

- displaying said difference on a visual display device.

3. The method defined in claim 1 comprising the additional step of:

- indicating said difference on a pointer-type indicating instrument.

4. The method defined in claim 1 comprising the further step of: correcting the transmitted signal by means of said difference.

5. In a data transmission system having means for pulse controlled transmitting and receiving message signals by means of phase difference modulation of a carrier signal, said phase difference modulated carrier being subject to amplitude modulation by band limitation, means for producing phase scanning pulses, which occur in consecutive modulation sections and an amplitude demodulator for producing an amplitude signal, modulation sections of said phase difference modulated carrier being assigned to modulation sections of said amplitude signal, the improvement comprising:

- delay means for producing scanning pulses from said phase scanning pulses,
- first and second scanning circuit means having, respectively, first and second inputs, said first inputs being connected to receive said amplitude signal and said second inputs being connected to receive said scanning pulses, said first and second scanning circuits being constructed to sample instantaneous values of said amplitude signal using said scanning pulses and to store the maximum and minimum instantaneous values occurring during an observation period and
- difference forming circuit means connected to receive said stored maximum and minimum instantaneous values and to form a signal corresponding to the difference between them.

6. The improved data transmission system defined in claim 5 wherein said difference forming circuit means comprises first and second resistances and a diode, a first terminal of said first resistance being connected to a first output of said difference forming circuit means, a first terminal of said second resistance being connected to a second output, said diode being connected between second terminals of said first and second resistances.

* * * * *